(12) United States Patent
Mackin

(10) Patent No.: US 9,077,677 B2
(45) Date of Patent: Jul. 7, 2015

(54) METHODS OF SHARING A UNIFORM RESOURCE LOCATOR (URL), AND A URL SHARING UTILITY AND SOCIAL NETWORK FACILITATING GROUP CHAT ABOUT SHARED LINKS

(71) Applicant: John Christian Mackin, Nichols, NY (US)

(72) Inventor: John Christian Mackin, Nichols, NY (US)

(*) Notice: Subject to any disclaimer, the term of this patent is extended or adjusted under 35 U.S.C. 154(b) by 216 days.

(21) Appl. No.: 13/799,025

(22) Filed: Mar. 13, 2013

(65) Prior Publication Data

US 2013/0311906 A1 Nov. 21, 2013

Related U.S. Application Data

(60) Provisional application No. 61/648,476, filed on May 17, 2012.

(51) Int. Cl.
*H04L 12/58* (2006.01)

(52) U.S. Cl.
CPC ...................................... *H04L 51/32* (2013.01)

(58) Field of Classification Search
CPC ........................................................ H04L 51/32
USPC .......................................................... 715/758
See application file for complete search history.

(56) References Cited

U.S. PATENT DOCUMENTS

2005/0288951 A1* 12/2005 Stone et al. ........................ 705/1
2010/0005268 A1* 1/2010 Yang et al. ..................... 711/202

OTHER PUBLICATIONS

"Wayback Machine" (hereinafter WayBack) http://archive.org/web/web.php published on Mar. 12, 2010.*
"Chat Anywhere with Chattp", available at http://blog.harmonypark.net/2011/05/chat-anywhere-with-chattp.html, dated May 12, 2011, 1 page.
http://digg.com/, available at https://web.archive.org/web/20120516055318/http://digg.com/, 2012, 2 pages.
http://www.gabbly.com/, available at https://web.archive.org/web/20090211052503/http://gabbly.com/, 2009, 1 page.
http://www.google.com/+/learnmore/hangouts/, available at https://web.archive.org/web/20120514103424/http://www.google.com/+/learnmore/hangouts, 2012, 1 page.
http://www.reddit.com/, available at https://web.archive.org/web/20120515213843/http://www.reddit.com/, 2012, 2 pages.

(Continued)

*Primary Examiner* — Peiyong Weng
(74) *Attorney, Agent, or Firm* — Brown & Michaels, PC

(57) ABSTRACT

A URL sharing utility and social network facilitates group discussions about shared links. Unlike conventional applications, this service enables live discussions about specific URLs, so people who join the discussion already share an interest in a particular topic. The sharing mechanism preferably enables many people around the world to see the discussion topic and join if they are interested. Sharing a URL together with a second URL reserved for a live discussion of the first URL preferably enables users to promote the discussion in a less socially risky way. A one-to-one correspondence between one URL and a second, predictable network address for the discussion of the original URL allows everyone who shares an interest in a URL to be funneled into a single discussion about that URL. Users preferably specify explicit social and professional networking policies so that every discussion with others carries the promise of a beneficial, lasting connection.

22 Claims, 9 Drawing Sheets

(56) References Cited

OTHER PUBLICATIONS http://www.socialmunch.com/, available at https://web.archive.org/web/20120511021227/http://www.socialmunch.com/, 2012, 4 pages.

http://www.spreecast.com/, available at https://web.archive.org/web/20120516174336/http://www.spreecast.com/, 2012, 8 pages.

http://tinychat.com/, available at https://web.archive.org/web/20120511015243/http://tinychat.com/, 2012.

Yaplet, available at https://web.archive.org/web/20110720060047/http://www.yaplet.com/, 2011, 1 page.

* cited by examiner

METHODS OF SHARING A UNIFORM RESOURCE LOCATOR (URL), AND A URL SHARING UTILITY AND SOCIAL NETWORK FACILITATING GROUP CHAT ABOUT SHARED LINKS

REFERENCE TO RELATED APPLICATIONS

This application claims one or more inventions which were disclosed in Provisional Application No. 61/648,476, filed May 17, 2012, entitled "A COMBINED URL SHARING UTILITY AND SOCIAL NETWORK THAT FACILITATES GROUP CHAT ABOUT SHARED LINKS". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of social media. More particularly, the invention pertains to methods of sharing a uniform resource locator and services to provide live discussions about internet-based content among previously-unacquainted members of the public.

2. Description of Related Art

Many people want to increase their contacts on social networking sites such as Facebook, Twitter, LinkedIn, and Google+ for social and professional reasons. However, it is difficult to find and get to know new people online who share your interests and to determine among these people those with whom there might be a mutual interest in becoming "friends", "followers", or "connections". Even if such potential contacts could be identified, it is difficult for both parties to get to know each other well enough to be comfortable to agree to add each other on social networking sites or to make these new contacts socially or professionally meaningful.

There are a few non-dating social websites that allow people who are unacquainted with each other to meet live online and discuss topics. Tinychat.com is a website in which people create their own public "rooms" that are assigned a name of their choosing and that are based on a live feed from their own webcam. Other Tinychat.com members can join these rooms if they wish to participate in text chat or add their own webcam feed to the room. The social network Google+ includes a similar feature called Hangouts, in which users can create public rooms based on any name and a feed of their own webcam. As in Tinychat, Google Hangout members can join "hangouts" and add their own webcam feed to the hangout. Similar services are provided by other web applications, such as Spreecast.com and SocialMunch.com. Another web application, Chattp.com, does not easily allow unacquainted people to meet, but it does provide a way for friends or acquaintances to chat live on a web page. Finally, Gabbly.com and Yaplet.com, two now-defunct services, allowed members of the public to chat in a sidebar frame on web pages.

Current chat applications fail to help people develop meaningful contacts, because they fail to address the many inhibitions that most people feel about joining a public chat and even about announcing to others the availability of such a chat. As a result, these sites and applications fail to bring together the numbers people with common interests in live chat rooms that are necessary to make the meeting of good friendship candidates likely. For example, one of the inhibitors that prevent people from using chat sites is that readers must go out of their way to find and use them as a separate activity, instead of seeing live social opportunities arise incidentally as they engage in their normal online activities.

Another inhibitor to joining live chats in rooms is that frequently the rooms are owned by an individual or group, so that the prospect of joining them seems like an intrusion into someone else's private space, as opposed to a meeting in a neutral location. In addition, 1) existing chat applications are often typified by aimless (if not vulgar) discussions that at best serve as temporary distractions, 2) they are often dominated by a single youthful demographic and may be or seem unwelcoming to people who do not fit this particular demographic, 3) the sharing of links to join these live chats carries too much of a social risk for many people, 4) meeting new people through these chat services seems pointless to many people, even though meeting new like-minded people in general may be an attractive prospect to them, and 5) the topics assigned to public chat rooms are not specific enough to users' interests to make the prospect of meeting other unknown people in a public chat devoted to these topics seem worthwhile.

SUMMARY OF THE INVENTION

In preferred embodiments, a uniform resource locator (URL), or network address, sharing utility and social network service facilitates group chat about shared links. Unlike conventional group chat applications, the service enables members of the general public to engage with each other in live discussions about the content found at specific network addresses (URLs), so people who join the discussion already share an interest in a very specific particular topic. In some embodiments, this group chat is a group video chat.

In preferred embodiments, a method of facilitating the sharing of a first URL includes a computer receiving the first URL from a first user. The method also includes the computer automatically generating a second URL, where the second URL points to at least one service related to the first URL and the service is useable by the first user and at least one additional user. The method further includes the computer providing the second URL to the first user.

In other preferred embodiments, a method of sharing a first URL includes a first user providing the first URL to a URL sharing utility service. The method also includes the first user receiving from the URL sharing utility service a second URL, where the second URL points to at least one service related to the first URL and the service is useable by the first user and at least one additional user. The method further includes the first user posting an electronic message including the first URL and the second URL to a social network location to share the first URL.

A mechanism provided by embodiments of the present invention to first facilitate sharing a URL and then automatically provide a second URL to a network site dedicated to a discussion about the content found a that first URL preferably enables many people around the world to share or see discussion links as they engage in their usual activities online. Since the public discussions that the service intends to foster are dependent on the use of the service as a URL sharing tool, the service also offers an unusually convenient method for ordinary URL sharing as a way to encourage its use. The tool allows users to initiate the sharing of a page by typing a very simple set prefix, such as "shareanddiscussthis.com/", followed by the page's URL in the network address box of a web browser or by clicking a bookmarklet that automatically performs the same function. Alternatively, users may also paste a URL into a particular text field on a web landing page owned or run by a party implementing the service to start the process of sharing that URL. After this point, users may choose to share just a shortened URL resolving to the original URL, just a shortened URL resolving to a discussion link about the original URL, or both. Allowing a primary URL to be shared together with a secondary URL pointing to a live public discussion of this primary URL is an important aspect of the service, because users typically feel shy about sharing a link to a chat room. Allowing users to provide a link to a public chat incidentally, as an extra feature accompanying a normal URL link, preferably reduces the inhibition to promoting such chat links.

The service creates for every primary URL a secondary, predictable URL used for a public discussion of this same primary URL. This one-to-one correspondence means that all people worldwide who wish to follow a discussion link about a particular item, such as a web page, that is found at a URL, are necessarily funneled into a single discussion about that item with other members of the general public. The fact that discussions do not belong to any particular user or group of users makes the meeting space neutral and preferably reduces the inhibitions to participating in chats that may occur with other chat services.

A number of additional preferred features of the service further reduce inhibitions to chat. For example, users are preferably identified by real names so that civility is encouraged, in contrast to pseudonymous chat. In a preferred embodiment, discussions are divided into groups limited to four to eight people so that individuals in the group can get to know each other and so that their voices are not lost in a larger group. Users in the discussion platform also preferably specify social and professional networking policies in their user profiles. These social networking policies provide a practical incentive, namely increasing social and professional contacts, for people to participate in chat and also help reduce any inhibitions that might arise from participating in chats that do not have any explicit purpose or practical benefit. In addition, the policies further reduce inhibitions to chat and reduce social risk by clarifying the expectations individuals have before they want to become contacts.

DETAILED DESCRIPTION OF THE INVENTION

Figure 1:
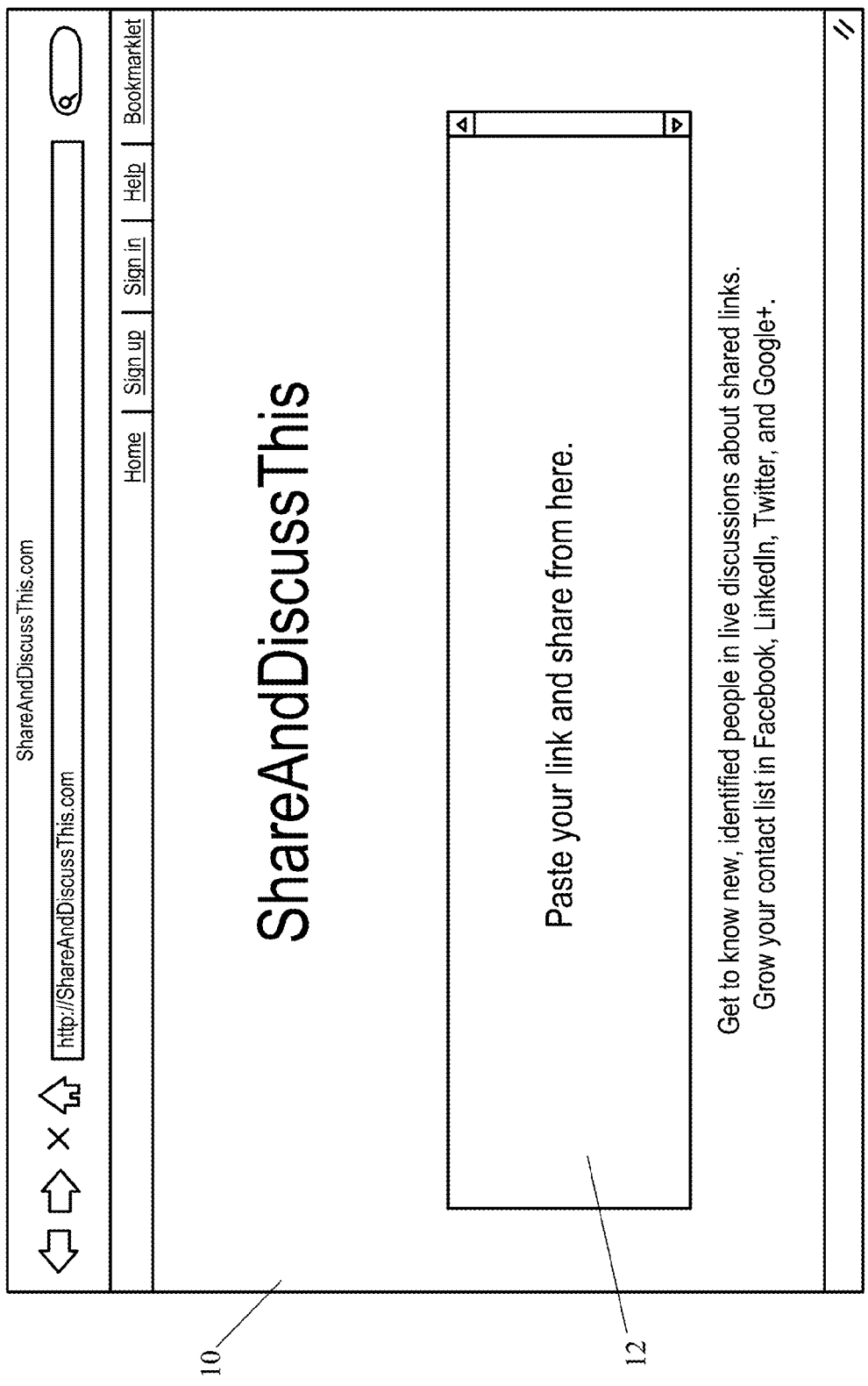
FIG. 1 shows a landing page for a URL sharing utility and social network prior to modification by a user in an embodiment of the present invention.

The URL sharing utility and social network service allows many different people who share interests to come together preferably identified by real names and get to know each other through discussions about shared links in a live setting. In some embodiments, the live setting is a video chat room. In other embodiments, the live setting is a non-video chat room. These people are presumably grouped by interest because they naturally want to discuss pages they are commonly interested in. To help identify potential contacts among other members, users preferably have searchable profiles that specify their social networking policies, basically who they would like to connect with, and under what circumstances, on various social networking sites as well as in the real world. These explicit social networking policies provide an incentive for chat and reduce the social risk involved in reaching out to others to become contacts, and the discussion medium provides a way for these users to get to know each other to the extent they want to before they do become contacts.

The URL sharing utility and social network differs from and improves upon what currently exists. No other application expands the features of a URL sharing utility by adding links to live discussions about shared URLs, much less provide an entire social network based on group discussions. In some embodiments, webcams are used to enable video chat rooms. Combining a URL sharing utility with a webcam-based social network, particularly when implemented with explicit personal friending policies and a requirement for non-pseudonymous user identification, solves a number of problems that have hindered previous efforts to encourage people to develop meaningful new friendships online.

As a tool to foster discussions and new connections among people, URL sharing utility and social network preferably solves a particular problem related to human psychology: People want to make new beneficial contacts, but they feel shy about promoting the kinds of discussions that will encourage sufficient numbers of people to gather and enable them to develop those contacts. A preferred purpose of the URL sharing utility and social network is to lower the social risk of promoting discussions by allowing people to provide a second link to the discussion incidentally along with a normal link. The lowered social risk preferably ultimately brings more people together.

Beyond the case of using the URL sharing utility to promote discussions in the way described, the URL sharing utility also may be used by anyone who wants minimize social risk as he or she enhances, modifies, or augments content related to a shared URL. For example, someone might want to share a second link for vision-impaired people that automatically reads the original page aloud, but he or she might only feel comfortable providing this service incidentally. Alternatively, he or she might want to translate all of his or her pages into the language of his or her community, but he or she only feels comfortable doing so incidentally, and so on. By lowering the social risk of providing any such service among a huge number of people, the availability of that service in the public is generally increased.

Embedding a URL-based discussion service as an incidental in a URL sharing utility preferably solves a problem that these URL-based discussion services have to this point failed to attract many users.

For online chats to feel both enjoyable and worthwhile to much greater numbers of people, such a chat needs to attract multiple simultaneous users who are grouped together by an interest in discussing a very specific topic, users need to be identified by their real names, the participation in and sharing of these live discussions should carry little or no social risk, prospective users should perceive a practical and lasting benefit to participation, and the topic of discussion should be naturally focused and substantive. Conventional chat formats do not meet any of these requirements.

Unlike conventional chat applications, the URL sharing utility and social network service enables live discussions about content at specific URLs, so people who join the discussion already share an interest in a very particular topic. Internet-based content, as used herein, may be any kind of information posted at a specific URL with content that may include, but is not limited to, text, images, or audio. In some embodiments, the group chat is a group video chat. In addition, the sharing mechanism preferably enables many people around the world to see the discussion topic and join if they are interested. Sharing a URL together with a second URL reserved for a live discussion of the first URL preferably enables users to promote the live discussion in a less socially risky way. The very specific topic for each discussion preferably makes discussions more focused and comfortable. Creating a one-to-one correspondence between any primary URL and a secondary, predictable network address used for a discussion of the primary URL enables all people worldwide who share an interest in a particular URL to be funneled into a single discussion about that URL. Users are preferably identified by real names so that civility is encouraged in contrast to pseudonymous chat. In a preferred embodiment, discussion groups are limited to small groups of four to eight people so that individuals can get to know each other and their voices are not lost in a larger group. Users in the discussion platform preferably specify explicit social and professional networking policies so that every discussion with others carries the promise of a beneficial, lasting connection.

In preferred embodiments, a method of sharing a first uniform resource locator includes a computer receiving the first uniform resource locator from a user and the computer automatically generating a second uniform resource locator, and a shortened version thereof, for a webpage providing at least one service related to the first uniform resource locator.

In other preferred embodiments, a method of sharing a discussion website with a plurality of users to discuss a content of a first uniform resource locator includes a computer receiving a request to discuss the first uniform resource locator from any of the plurality of users and the computer automatically generating a second uniform resource locator, and a second version thereof, for the discussion website.

Figure 5:
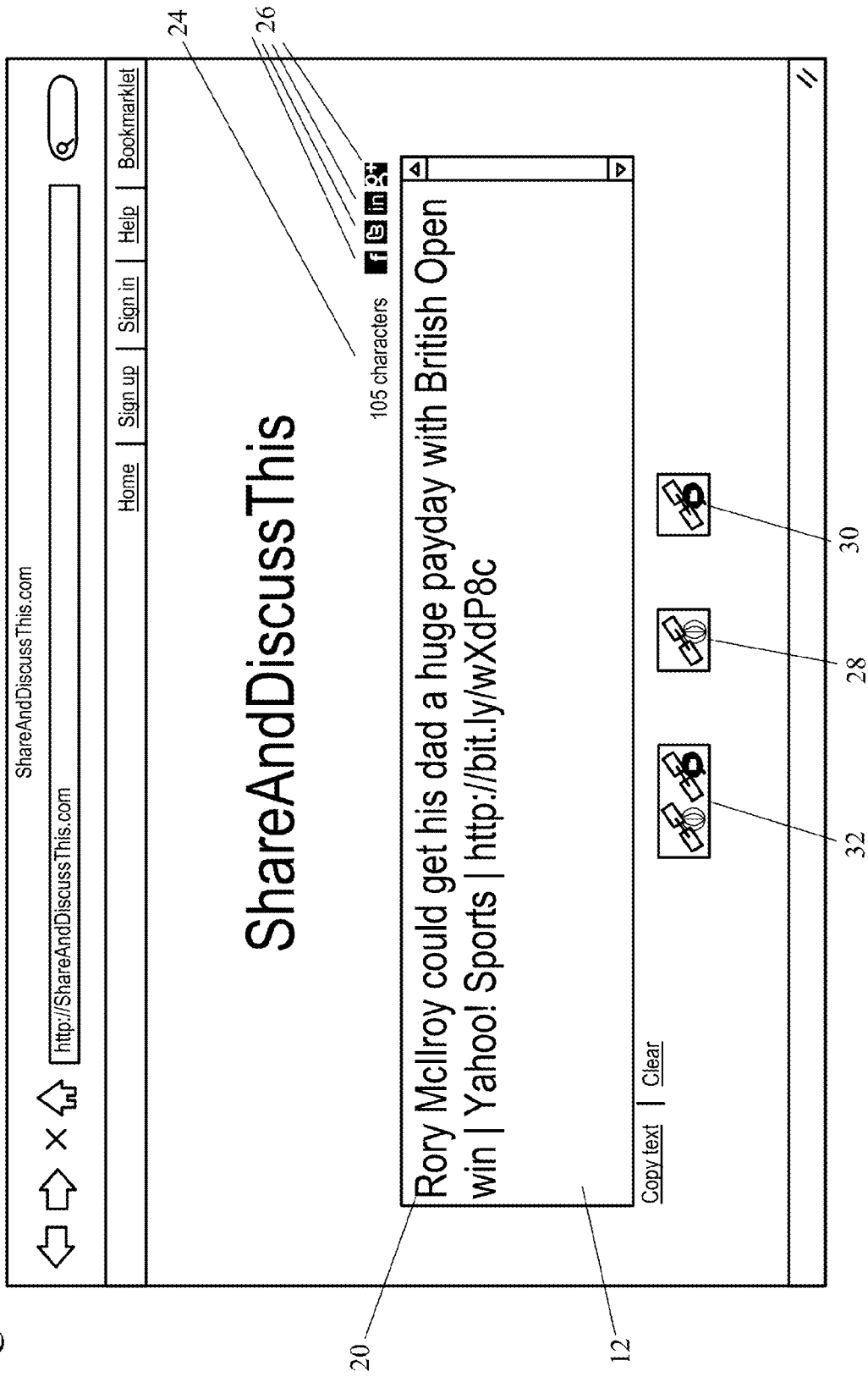
FIG. 5 shows a second return field provided by the URL sharing utility and social network after analysis of the URL typed in the text field.
Figure 6:
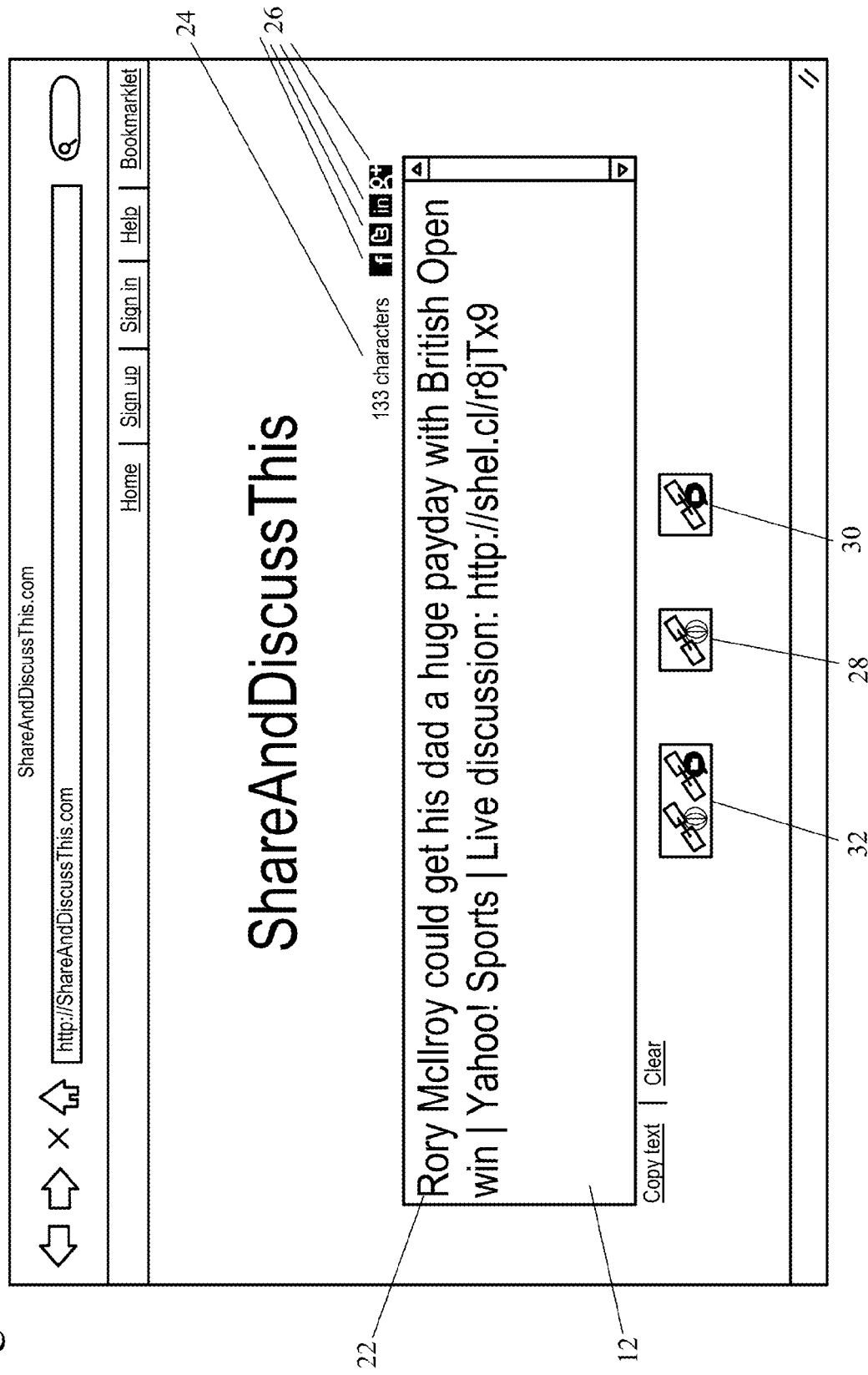
FIG. 6 shows a third return field provided by the URL sharing utility and social network after analysis of the URL typed in the text field.
Figure 7:
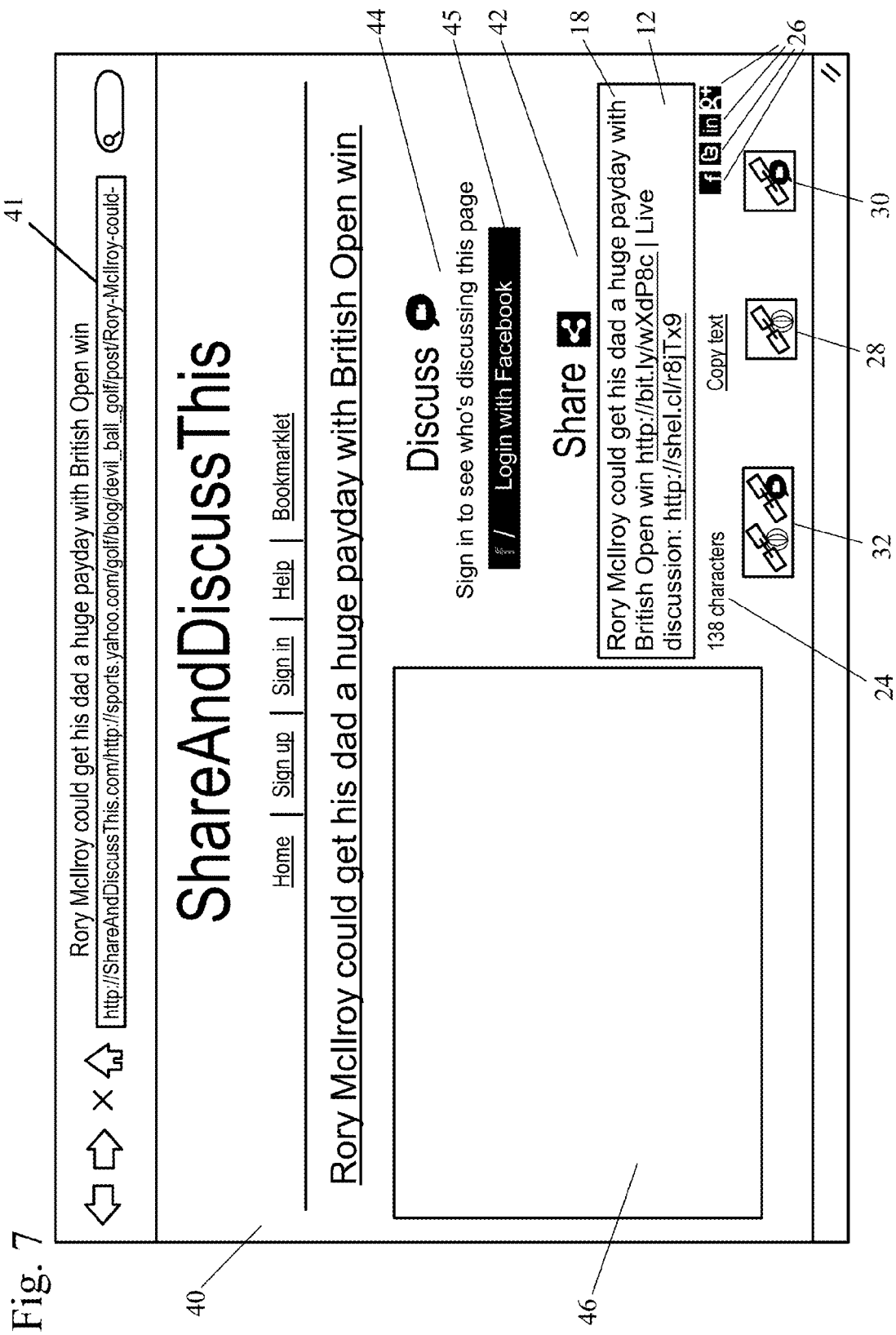
FIG. 7 shows a landing page displayed by the URL sharing utility and social network after adding the fixed URL prefix to the original URL in the browser in an embodiment of the present invention.
Figure 8:
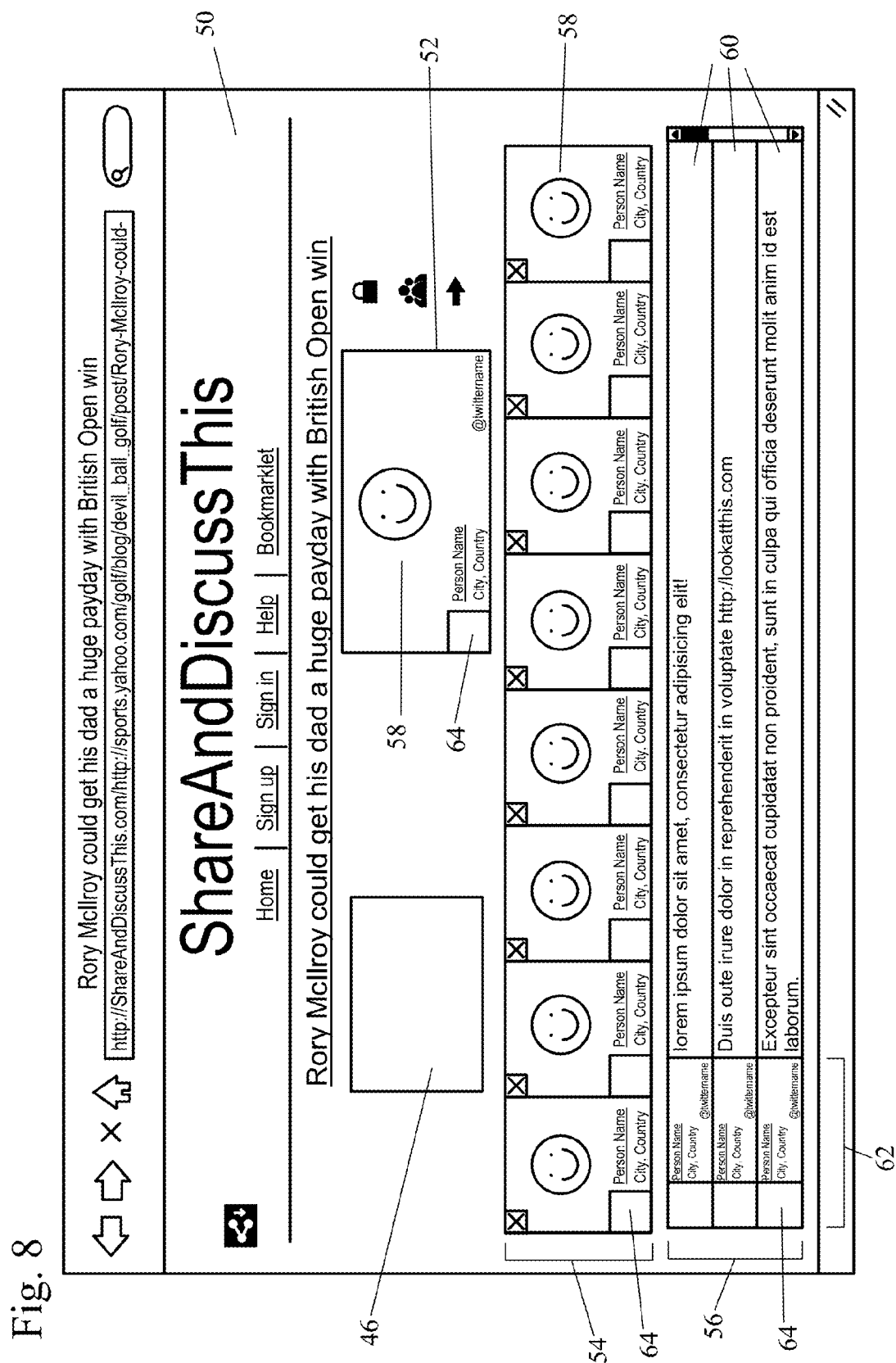
FIG. 8 shows a video and text chat room display configuration in an embodiment of the present invention.

In a preferred embodiment, the web application includes two main pages, the landing page, shown in FIG. 1 through FIG. 6, and the URL discuss/share page, shown in FIG. 7 and FIG. 8. Both of these pages include a shared URL text field, the sharing feature, a link to the discuss/share bookmarklet, and a link to user profiles.

Figure 9:
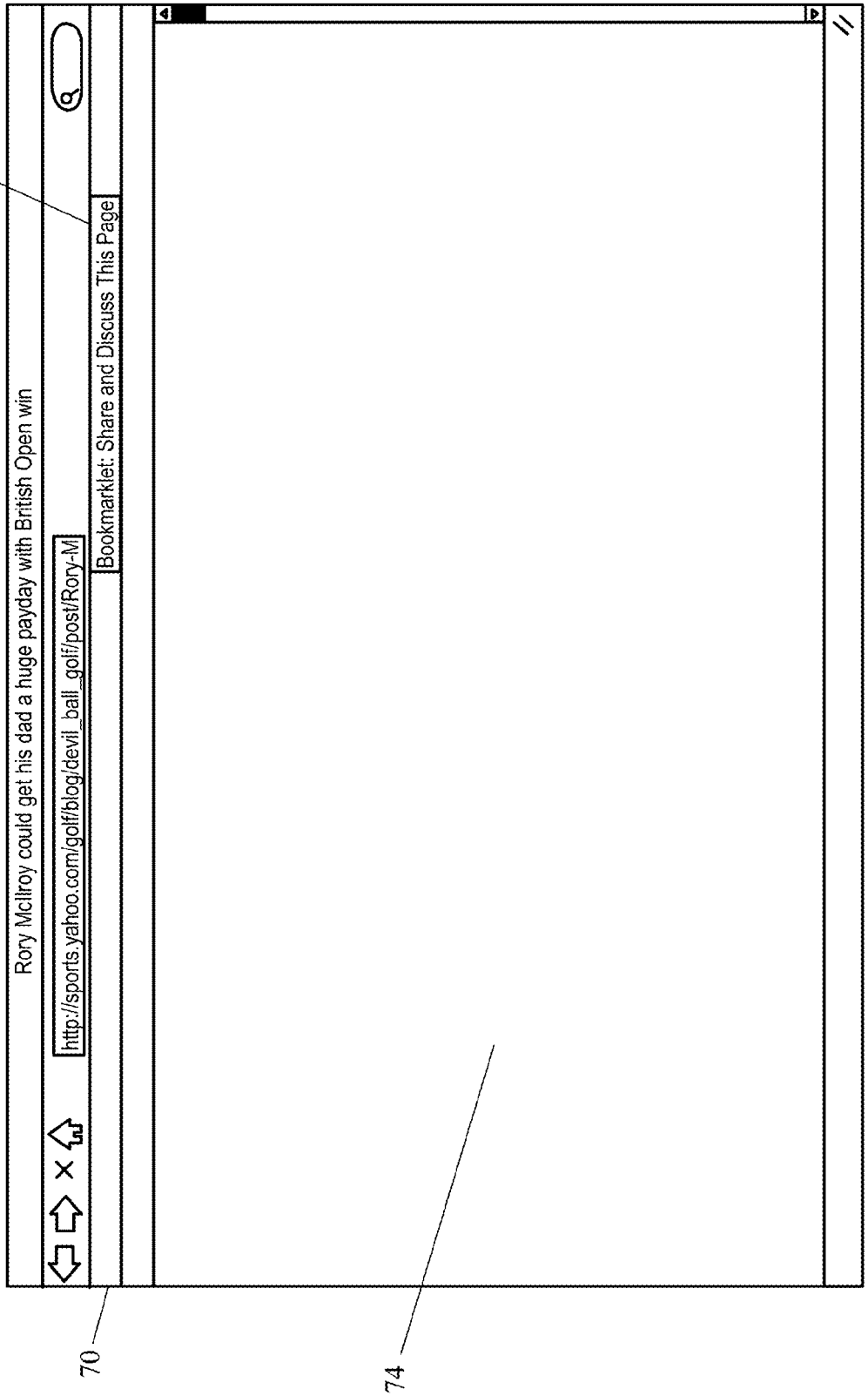
FIG. 9 shows an internet browser with a bookmarklet in an embodiment of the present invention.

In some embodiments, a discuss/share bookmarklet, as shown in FIG. 9, is used on desktop browsers to automatically add the fixed URL prefix to any network address currently being visited. When the URL prefix is added to any network address manually or by clicking the discuss/share bookmarklet, the resulting new network address, referred to herein as the discuss/share page long network address, leads to the URL discuss/share page, which is dedicated to sharing and discussing the original URL.

The landing page of the service preferably includes a shared URL text field, into which a user may paste any URL and then generate a shortened network address and/or a URL discuss/share page shortened network address, along with a title text editable by the user, and intended to accompany the link, when shared. The shortened network address is preferably a shortened version of the long network address that also leads to the URL discuss/share page. From the shared URL text field, the user may use the sharing feature to share the shortened network address or the URL discuss/share page shortened network address on various social networking sites or copy them to email.

The URL discuss/share page preferably includes a shared URL text field pre-populated with the shortened network address, the URL discuss/share page shortened network address, and the title text. The user may use the sharing feature to share these network addresses from the shared URL text field. The discuss/share page preferably also includes a web page thumbnail of the original shared page, a link to visit the original page, and a link to enter a video and text chat that is reserved and dedicated for discussion of the content of the original network address.

In a preferred embodiment, a user must first create an account and sign in before entering the video and text chat. A user profile is preferably created with each user's account, and each user may preferably edit his or her user profile or search other profiles by clicking links available on any page in the web site after the user has signed in.

When the chat room is a video and text chat room, the chat room preferably includes multiple groups of a fixed maximum number of webcams, such as seven or eight per group. Each user may preferably view the other users in each group and enter into any group with available space.

The URL sharing utility and social network service is preferably used to help people share a URL, help foster discussion about a URL among the general public, or both.

Before using the URL sharing utility and social network, the user may optionally take the preparatory step of installing the share/discuss bookmarklet in his or her web browser's toolbar.

When the user wants to share and/or discuss a page the user is currently visiting, he or she may do so by taking any of the following three actions:

A. Clicking on the bookmarklet if it is installed in the user's web browser.

B. Typing the URL prefix before the URL of the currently-visited page in the address box of the web browser and then pressing the Enter key.

C. Pasting the URL of the web page into the shared URL text field on the landing page of the service.

If the user chooses option A or option B, the URL discuss/share page opens, which is a central tool of the URL sharing utility and social network. The URL discuss/share page for any given URL is preferably found at the network address "URL-PREFIX/ORIGINAL-URL". This page by default preferably includes a thumbnail of the original page, a set of standard links including options to search or edit user profiles, an "entry button" to enter a live discussion about the original page, and a shared URL text field that preferably includes by default the title of the original page, a shortened URL of the original network address, and a shortened URL (preferably labeled as "Live discussion") of the currently-visited URL discuss/share page network address. The user preferably may adjust the content of the shared URL text field by choosing options to include either only the shortened URL of the original network address and its page title or only the shortened URL of the currently-visited URL discuss/share page network address, the original page title, and the label "Live discussion". The user preferably may also manually edit the content of the shared URL text field. Options to share the content of the shared URL text field on social networks or copy the content to a memory buffer (i.e., a "clipboard") are connected to the shared URL text field.

If the user instead chooses option C instead of option A or option B above, the URL that the user pastes into the shared URL text field of the landing page is automatically shortened, and at the same time, the title of the page appears before this newly-shortened URL. In addition, a shortened network address pointing to the URL discuss/share page for the originally pasted URL is also preferably included by default, preceded by the label "Live discussion." As on the URL discuss/share page, on the landing page the user preferably may adjust the content of the shared URL text field.

Users preferably always enter live video chat discussions about a given URL through its corresponding URL discuss/share page. Users preferably may arrive at this page by clicking on a link to it, which may appear on a social networking site or elsewhere, by clicking the bookmarklet while visiting any page, or by entering the fixed URL prefix before a network address they are currently visiting.

The URL discuss/share page preferably includes an entry button to the live video chat discussion. A user preferably must create an account and sign in to the site before he or she is granted entry to the discussion. In a preferred embodiment, when the user creates his or her account, the user must specify a Facebook user name and password, or another service that requires a user name that is the user's real name. This real name and photo identify the user in the live discussions.

When the user enters the live discussion, he or she is placed in a small discussion group of a fixed, small number of people. In a preferred embodiment, the maximum number of people in a room is eight. If more people want to enter a discussion than are available in the first discussion group, they are placed in overspill groups. In a preferred embodiment, paying subscribers may look at the membership of all of these groups and enter the group of their choice. In a preferred embodiment, a paying subscriber may also "lock" a group as private so that no new entrants are allowed. Within a group, all user camera feeds preferably appear, and these feeds are preferably identified by real names and photos of the users.

A user preferably may click on another user's name to open his or her profile. Paying subscribers preferably may also use a search function to locate other users within a given geographical distance who match selected criteria.

The URL sharing utility and social network preferably includes a web server, a database server, and the following network services, all of which may be provided by one or more third parties:

a. Login application programming interfaces (APIs) for a social networking site in which users are identified only by real names.
b. An API for a public URL shortening service.
c. An API for private URL shortening service.
d. A text and URL sharing service.
e. An API for URL thumbnail service.
f. A video chat service.
g. A text chat service.

The URL sharing utility and social network communicates between web clients and the web server. The domain name server (DNS) may be any available DNS. The URL sharing utility and social network preferably needs to build five sets of services for the DNS, namely landing page services, discuss/share page services, discuss/share bookmarklet, video/text chat services, and database/user account services. These services are preferably built by using code and scripts to provide the features described herein.

In a preferred embodiment, the most important elements of the URL sharing utility and social network include the text/URL sharing service and some version of chat offered through a link shared with the original URL.

In a preferred embodiment, highly recommended elements of the URL sharing utility and social network include a public URL shortening service, a discuss/share page, preferably found at a network address such as URL-PREFIX/ORIGINAL-URL, providing a second, shortened version of the network address URL-PREFIX/ORIGINAL-URL, third-party login/user identification via a social networking site in which users are identified by real names, searchable user profiles specifying social networking policies, and a mechanism to allow private chat among group members or to "lock and hide" a discussion group so that a group discussion is made private.

In a preferred embodiment, additional elements of the URL sharing utility and social network include one or more of an interface for mobile phones and electronic tablets, an API allowing developers to create their own software interfaces to the URL sharing utility and social network, an API allowing developers to build on the live discussion platform with applications that allow collaboration or provide some common group activity, connections to one or more payment services, such as, for example, PayPal, for users who sell goods or services to each other, a discussion board (as opposed to live chat) at the discuss/share page network address, a method to facilitate and augment the sharing of live virtual meetings constructed around URLs that specify a physical location on earth or in space, and generic code available to web administrators enabling them to include a direct link for users to enter the live discussion without using the bookmarklet.

A user develops meaningful new friends, followers, and contacts online by using the URL sharing utility and social network to participate in discussions and read user profiles of other members and by then initiating connections with chosen users on social networking sites in a manner that is consistent with the preferences specified in their profiles.

A user may use the URL sharing utility and social network to join these live discussions in any of four different ways. First, the user may click a link to a live discussion that someone else has created by using the URL sharing utility and social network. Such link may be posted and found in e-mail, in public forums, on Facebook pages, or by searching for hashtags on Twitter or other services. Second, the user may click on a link to a live discussion that the user has created or posted by using the URL sharing utility and social network. To create a link to a live discussion of a particular web page, a user may paste the URL of the web page on the landing page of the URL sharing utility and social network. This step preferably automatically generates a live discussion link that the user may copy or share. Alternatively, the user may first type the network address prefix before the network address of the currently-visited page in a web browser, or click on the share/discuss bookmarklet when the user is visiting a page he or she want to discuss or share. At this point, a link to a live discussion that the user may copy or share preferably automatically appears in the shared URL text field in a new URL discuss/share page that opens. Third, the user may use the network address prefix or the bookmarklet to open the discuss/share page, and then join a live discussion directly from the newly-opened discuss/share page. Fourth, the user may visit a page provided by the URL sharing utility and social network that displays a list of currently-active discussions and then click on a link to one of these active discussions.

To read user profiles of other users, a user may simply click on another user in a particular chat room the user has entered.

A user may also select a Search Profiles link to search for users according to selected criteria, such as interests, distance, or social networking policies.

FIG. 1 through FIG. 9 show examples of preferred embodiments of a URL sharing utility and social network of the present invention. In the figures, the URL sharing utility and social network is called "ShareAndDiscussThis", the domain name of the URL sharing utility and social network is ShareAndDiscussThis.com, and the fixed URL prefix is http://ShareAndDiscussThis.com, but any name and prefix may be used within the spirit of the present invention. Although FIG. 1 through FIG. 9 show a specific shared URL, any URL may be a shared URL within the spirit of the present invention.

Figure 2:
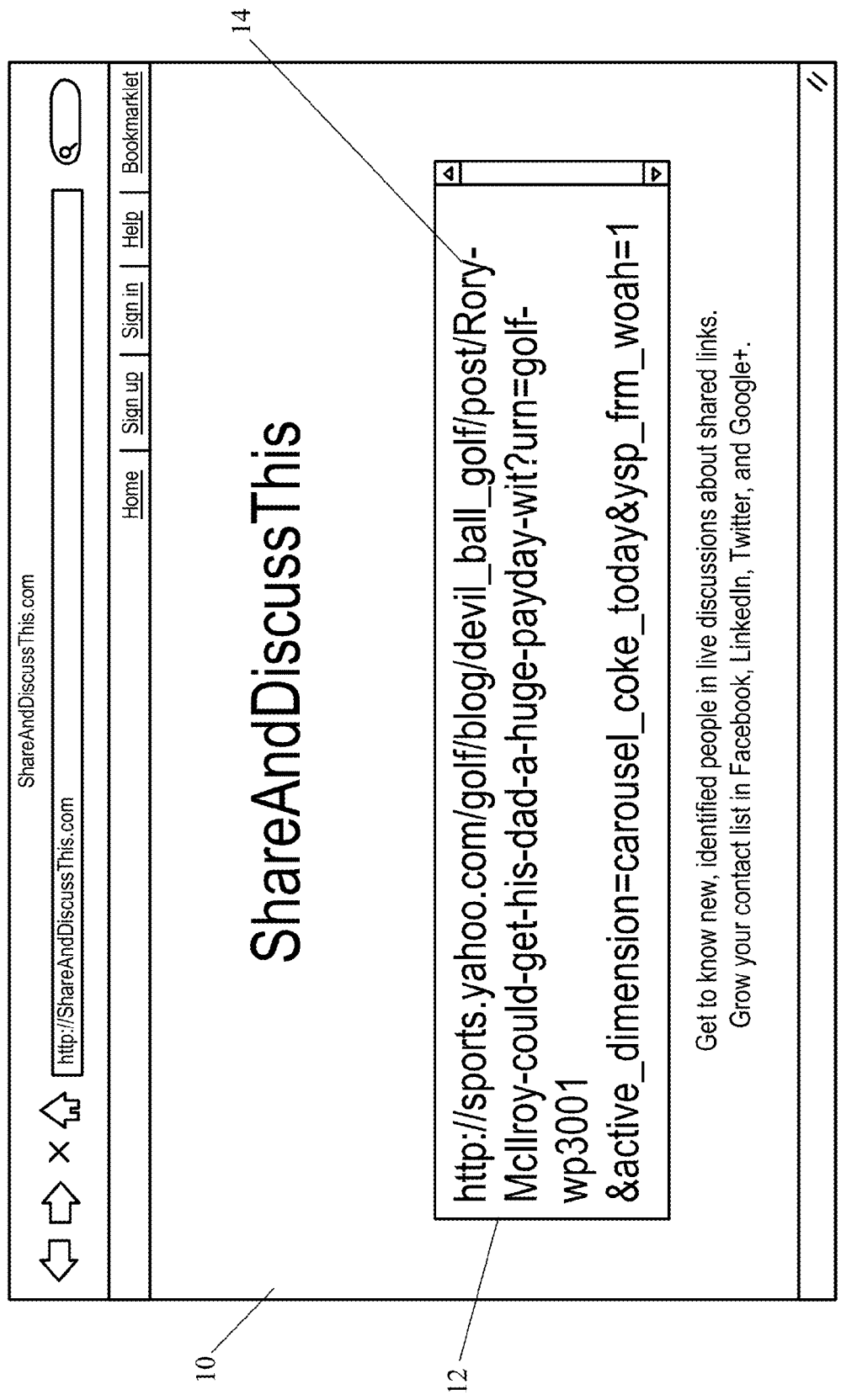
FIG. 2 shows the landing page of FIG. 1 with a URL entered in the text field.

FIG. 1 shows the home page or landing page 10 of the URL sharing utility and social network website. This home page 10 and all other web pages for the URL sharing utility and social network website preferably include a "Home" link that directs the user to this home page 10, a "Sign up" link that directs the user to a web page to create an account, a "Sign in" link that directs the user to enter a user name and password to sign in to the web page, a "Help" link that directs the user to a page where they can get help in understanding or navigating the URL sharing utility and social network website, and a "Bookmarklet" link that directly the user on installing a bookmarklet feature on their web browser. The landing page 10 also shows the name of the website and includes a shared URL text field 12. The user may type or copy/cut and paste the URL 14 of the internet-based content of interest into the URL text field 12, as shown in FIG. 2.

Figure 3:
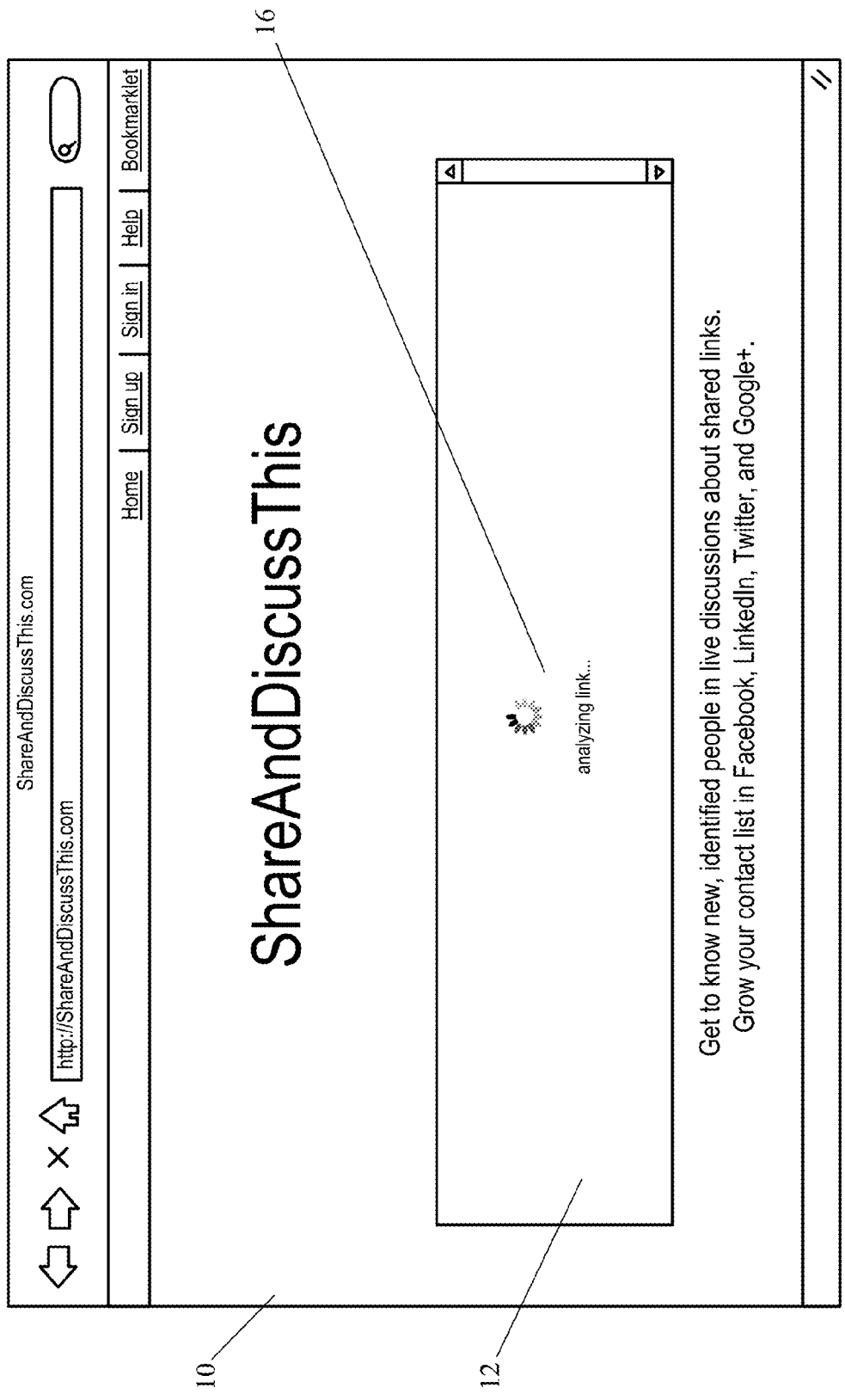
FIG. 3 shows the URL sharing utility and social network analyzing the URL entered in the text field in FIG. 2.

After the user enters the URL of the internet-based content of interest into the URL text field and presses the Enter key or otherwise indicates that the URL entry is complete, the URL sharing utility and social network website analyzes the entered URL. During this analysis, the URL sharing utility and social network website preferably provides feedback to the user of this process, such as by displaying an "analyzing link . . . " message 16, as shown in FIG. 3.

Figure 4:
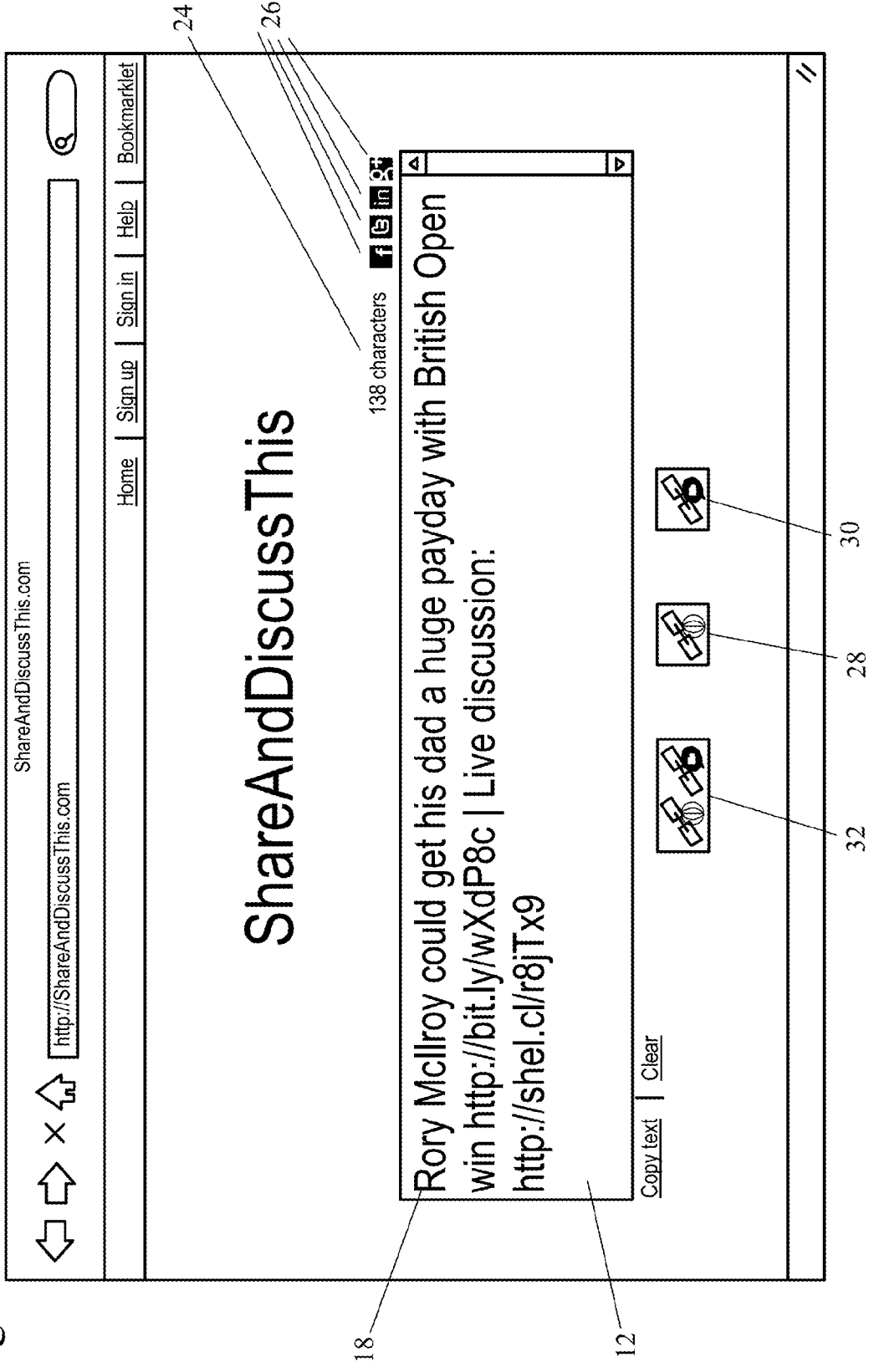
FIG. 4 shows a first return field provided by the URL sharing utility and social network after analysis of the URL typed in the text field.

The URL sharing utility and social network website preferably returns text that may be used by the user as a message into a post by the user on another social website, such as Facebook, for example. FIG. 4 shows a message 18 returned by the URL sharing utility and social network website to the shared URL text field 12. The message 18 in FIG. 4 is preferably the default original form of the message returned by the website after finishing the analysis of the URL entered in the shared URL text field 12. The message includes a shortened network address for the original URL (http://bit.ly.wXdP8c in FIG. 4) and a shortened URL discuss/share page network address (http://shel.cl/r8jTx9 in FIG. 4). FIG. 5 shows an alternative message 20, and FIG. 6 shows another alternative message 22, each of which may be alternatively provided by the URL sharing utility and social network website, which may be based on a user request, or edited from the first message 18 by the user in the shared URL text field 12.

As shown in FIG. 4 through FIG. 6, once the URL sharing utility and social network finishes analyzing the user-entered URL, additional features preferably appear around the shared URL text field 12. These features include a character count 24, social media post buttons 26, a link 28 to display the version of the postable message shown in FIG. 5, which includes a link only to the original URL but not a link to a live discussion, a link 30 to display the version of the postable message shown in FIG. 6, which includes a link only to a live discussion but not a link to the original URL, and a link 32 to re-display the original version of the postable message shown in FIG. 4, which includes links both for the original URL and a live discussion.

FIG. 7 shows a preferred design of the URL share and discuss webpage 40 displayed by the URL sharing utility and social network at the network address URL-PREFIX/ORIGINAL-URL 41. As discussed above, this URL share and discuss webpage 40 is the webpage that may alternatively be reached directly in at least any the following different ways: when at the website of the original URL, by clicking on the bookmarklet, if it has been installed in the user's web browser; when at the website of the original URL, entering the URL prefix before the original URL in the address box of the web browser; pasting the URL of the web page into the shared URL text field on the landing page of the service and then clicking on the resulting automatically-generated link for the URL discuss/share page; clicking on the link, which may be found anywhere on the internet, for the URL discuss/share page network address or the shortened URL discuss/share page network address; or cutting and pasting the URL discuss/share page network address or the shortened URL discuss/share page network address into the address box of the web browser. The URL share and discuss webpage 40 is generated automatically as soon as the first person to perform one of these actions for the shared URL does so, so that this first person is still directed to the URL share and discuss webpage 40.

The webpage 40 includes a share portion 42, a discuss portion 44, and a shared URL thumbnail portion 46. The share portion 42 includes the shared URL text field 12 with the postable message 18, the character count 24 for the postable message, the social media post buttons 26, and the three links 28, 30, 32 to display three different versions of the postable message that include either both the original URL and discussion links, or just a link to the original URL, or just the discussion link. The discuss portion includes a social network login link 45 and allows the user to sign in to see who is discussing the shared URL. Although the social network login link 45 is shown as a Facebook login link, one or more login links to any social network website may be used within the spirit of the present invention. The shared URL thumbnail portion 46 shows a thumbnail of the shared URL.

FIG. 8 shows a preferred layout for a live discussion webpage 50. The live discussion webpage in FIG. 8 is a live video/audio and text chat room page for a discussion group, but alternatively, a live discussion page may be only a live video/audio chat room page or only a live text chat room page within the spirit of the present invention. The live video/audio and text chat room page includes a shared URL thumbnail portion 46, a featured member video portion 52, a chat room video portion 54, and a chat room text portion 56. The featured member video portion 52 shows a live webcam picture 58 of the featured member. The featured member may be any member of the chat room, including, but not limited to, a mediator for the chat room, an organizer for the chat room, or a current speaker of the chat room. The chat room video portion 54 shows a live webcam picture of each member within the current discussion group. The chat room text portion 56 shows a scrolling list of text posts by members of the current discussion group in the time order that the text messages are posted to the current discussion group. Each text post 60 has a member identifier 62 to let members know which member posted each text comment. Chat room members may interact either verbally or by text with other members of the chat room. Each member is identified by their real name and their location, preferably city and country, and a still photo or avatar 64, all of which are preferably shown with the individual's live webcam picture 58 and as their identifier 62.

FIG. 9 shows a web browser 70 with a bookmarklet 72 of the present invention in the toolbar of the web browser 70. After browsing to the URL website 74, the user can read/watch the material at the URL website 74 and click on the bookmarklet 72 to go directly to the share and discuss page (see FIG. 7) at the network address "URL-PREFIX/ORIGINAL-URL". The bookmarklet 74 may be located anywhere on the toolbar of the browser 70.

In some embodiments, a user finding live chats of interest to the user is aided in the following way. Postable messages *all* include a hashtag, such as, for example #shareanddiscussthis, by default, so that users can search public posts for this hashtag on social networking sites. The URL sharing utility and social network website then includes a feature to facilitate searching for the hashtag on social networks and, in some embodiments, a list of featured active discussions.

Although the present invention has been described primarily in terms of a URL sharing utility and social network, certain aspects of the invention may have broader applications. In some embodiments, the URL sharing utility allows a user to share automatically-generated secondary links that may provide any number of services related to a primary shared URL. In some embodiments, the new website provides, through the secondary link, statistics about the primary website, which may include, but are not limited to, the date the primary website was first available or visited, the date the primary website was last modified or visited, the number of visitors, and the length of time the visitors spent at the primary URL website. Other services automatically provided by the secondary link may include a service that suggests sites similar to that of the primary link, a service that provides search term results at the page of the primary link for a term entered at the time the URL is shared, a service that provides ownership information about the domain name included in the full primary link (as opposed to its shortened URL version), a service that provides company information about the organization owning the domain name of that full primary link, and a service that provides an automatic translation of the page at the primary link into one or more of any number of languages translatable by the service.

The URL sharing utility and social network website and URL sharing utilities and methods are computer-implemented and preferably internet-based. The methods and displays presented herein are not inherently related to any particular computer or other apparatus. Various general purpose systems may also be used with programs in accordance with the teachings herein, or it may prove convenient to construct more specialized apparatus to perform the required method steps. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks include storage devices and computers that are communicatively coupled to dissimilar computers and storage devices over a network, such as the internet. A computer, as used herein, may be any automated processor that operates based on following instruction codes. In some embodiments, a computer refers to a network of two or more processors working together to follow such instruction codes. In some embodiments, the computer is a web server for a URL sharing utility and social network website.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of increasing public availability of at least one public service comprising:
   a) a computer receiving a first uniform resource locator from a first user;
   b) the computer automatically generating a second uniform resource locator, wherein the second uniform resource locator points to a service location providing the at least one public service in relation to the first uniform resource locator and the at least one public service is useable by the first user and at least one additional user; and
   c) the computer automatically providing the second uniform resource locator to the first user as part of an electronic message electronically postable to a social network location for the first user to share electronically with the at least one additional user;
   wherein the second uniform resource locator is a prefix followed by an identifier associated with the first uniform resource locator; and
   wherein automatically including the second uniform resource locator with the first uniform resource locator when electronically sharing the first uniform resource locator with the at least one additional user reduces psychological inhibitions of the first user to share the at least one public service with the at least one additional user, thereby increasing public availability of the at least one public service.

2. The method of claim 1, wherein the identifier is the first uniform resource locator.

3. The method of claim 1 further comprising the computer automatically generating a shortened uniform resource locator and providing the shortened uniform resource locator to the first user, wherein the shortened uniform resource locator resolves to the service location providing the at least one public service and wherein the shortened uniform resource locator is a shortened form of the second uniform resource locator.

4. The method of claim 1 further comprising the computer providing the first uniform resource locator to the first user electronically as part of the electronic message.

5. The method of claim 1 further comprising the computer confirming an existence of a first network location pointed to by the first uniform resource locator.

6. The method of claim 5 further comprising the computer evaluating an existence of a first content at the first network location.

7. The method of claim 1 further comprising the computer generating a webpage, wherein the second uniform resource locator points to the webpage.

8. The method of claim 1, wherein the at least one public service comprises at least one live discussion chat room dedicated to discussion of a first content available at a first network location pointed to by the first uniform resource.

9. The method of claim 8, wherein the live discussion chat room is a live webcam chat room showing a live webcam picture of each user in the live discussion chat room.

10. The method of claim 8 further comprising the computer allowing only a predetermined limited number of users into each live discussion chat room.

11. The method of claim 8 further comprising the computer collecting and storing information about the first user and the at least one additional user comprising each real name of the first user and the at least one additional user.

12. The method of claim 11 further comprising the computer displaying the real name of each user in association with any live information provided by each user in the live discussion chat room to all of the users in the live discussion chat room.

13. The method of claim 12 further comprising the computer collecting at least one social network username for at least one of the users and the computer displaying the real name of each user in association with any live information provided by each user in the live discussion chat room to all of the users in the live discussion chat room.

14. A method of increasing public availability of at least one public service comprising:
   a) a first user providing a first uniform resource locator to a uniform resource locator sharing utility service;
   b) the first user automatically electronically receiving a second uniform resource locator electronically postable as part of an electronic message to a social network location from the uniform resource locator sharing utility service, wherein the second uniform resource locator points to a service location providing the at least one public service in relation to the first uniform resource locator and the at least one public service is useable by the first user and at least one additional user; and
   c) the first user posting the electronic message, comprising the second uniform resource locator, to a social network location to electronically share the second uniform resource locator with the at least one additional user;
   wherein the second uniform resource locator is a prefix followed by an identifier associated with the first uniform resource locator; and
   wherein automatically including the second uniform resource locator with the first uniform resource locator when electronically sharing the first uniform resource locator with the at least one additional user reduces psychological inhibitions of the first user to share the at least one public service with the at least one additional user, thereby increasing public availability of the at least one public service.

15. The method of claim 14, wherein the identifier is the first uniform resource locator.

16. The method of claim 14 further comprising the first user receiving from the uniform resource locator sharing utility service a shortened uniform resource locator, wherein the shortened uniform resource locator resolves to the service location providing the at least one public service and wherein the shortened uniform resource locator is a shortened form of the second uniform resource locator.

17. The method of claim 14, wherein the at least one public service comprises a live discussion chat room dedicated to discussion of a first content available at a first network location pointed to by the first uniform resource locator.

18. The method of claim 17 further comprising the first user joining the live discussion chat room to discuss the first content with the at least one additional user.

19. The method of claim 14, wherein the at least one public service is selected from the group consisting of:
   an audio reading of a content of a webpage located at the first uniform resource locator;
   a language translation of the content of the webpage located at the first uniform resource locator;
   statistics about the webpage located at the first uniform resource locator;
   a list of websites similar to the webpage located at the first uniform resource locator;
   search term results in the content of the webpage located at the first uniform resource locator based on a search term entered when the first user posts the electronic message;
   ownership information about a domain name associated with the first uniform resource locator; and
   company information about an organization owning the domain name associated with the first uniform resource locator.

20. The method of claim 1, wherein the at least one public service is selected from the group consisting of:
   an audio reading of a content of a webpage located at the first uniform resource locator;
   a language translation of the content of the webpage located at the first uniform resource locator;
   statistics about the webpage located at the first uniform resource locator;
   a list of websites similar to the webpage located at the first uniform resource locator;
   search term results in the content of the webpage located at the first uniform resource locator based on a search term entered when the first user posts the electronic message;
   ownership information about a domain name associated with the first uniform resource locator; and
   company information about an organization owning the domain name associated with the first uniform resource locator.

21. The method of claim 1, wherein the service location includes a share portion to aid in sharing the second uniform resource locator from the service location.

22. The method of claim 14, wherein the service location includes a share portion to aid in sharing the second uniform resource locator from the service location.

* * * * *